US006421993B1

(12) United States Patent
Mackin et al.

(10) Patent No.: US 6,421,993 B1
(45) Date of Patent: Jul. 23, 2002

(54) MULTI-PIECE FEEDERHOUSE BUSHING RETAINER

(75) Inventors: Ryan Patrick Mackin, Milan; Andrew James Foerderer, Silvis; Richard C. Remley; Todd Neil Signer, both of East Moline, all of IL (US); Thomas Bernard Haar, Bettendorf, IA (US); Mark Alan Melton, Erie, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/795,752

(22) Filed: Feb. 28, 2001

(51) Int. Cl.[7] .............................................. A01D 45/00
(52) U.S. Cl. ............................................ 56/51; 56/219
(58) Field of Search ............................... 56/51, 53, 94, 56/103, 219, 15.9; 460/16

(56) References Cited

U.S. PATENT DOCUMENTS

| | | | |
|---|---|---|---|
| 3,665,688 A | * | 5/1972 | Sheehan et al. .............. 56/14.6 |
| 4,315,395 A | * | 2/1982 | Randall et al. ........... 280/765.1 |
| 4,641,490 A | * | 2/1987 | Wynn et al. .............. 56/10.2 E |
| 4,707,972 A | * | 11/1987 | Knepper ....................... 460/16 |
| 5,437,145 A | * | 8/1995 | Farley et al. ................. 403/14 |
| 6,116,008 A | * | 9/2000 | Digman et al. ............... 56/15.9 |
| 6,312,329 B1 | * | 11/2001 | Digman et al. ............. 460/105 |

OTHER PUBLICATIONS

John Deere Parts Manual for Model 9610 Maximizer Combine, pp. 80–2, 80–3, 110–28 and 110–29, publication date—Sep. 1999, published in U.S.A.
John Deere Part Drawing, unpublished.
John Deere Parts Manual for Model 7720 Combine, pp. 80–2 and 80–4, publication date prior to Jul. 1988, published in U.S.A.
Parts Manual for Case brand combine model No. 2188, pp. 9A–34, 9A–35, 9H–6 and 9H–7, publication date—Nov. 1994, published in U.S.A.
Claas, Lexion 480 Parts Manual, two pages, publication date—Jun. 1996, publication location—unknown.
New Holland, Model TX66 & TX68 Combine Parts Manual pp. 2–22 and 2–23, publication date—Jul. 1994, publication location—unknown.

* cited by examiner

Primary Examiner—Robert E. Pezzuto
Assistant Examiner—Nathan Mammen

(57) ABSTRACT

A two-piece retainer for securing a pivot tube of a combine feederhouse to a combine frame, having a first piece made of a polymer material and a second piece made of a metal material.

17 Claims, 3 Drawing Sheets

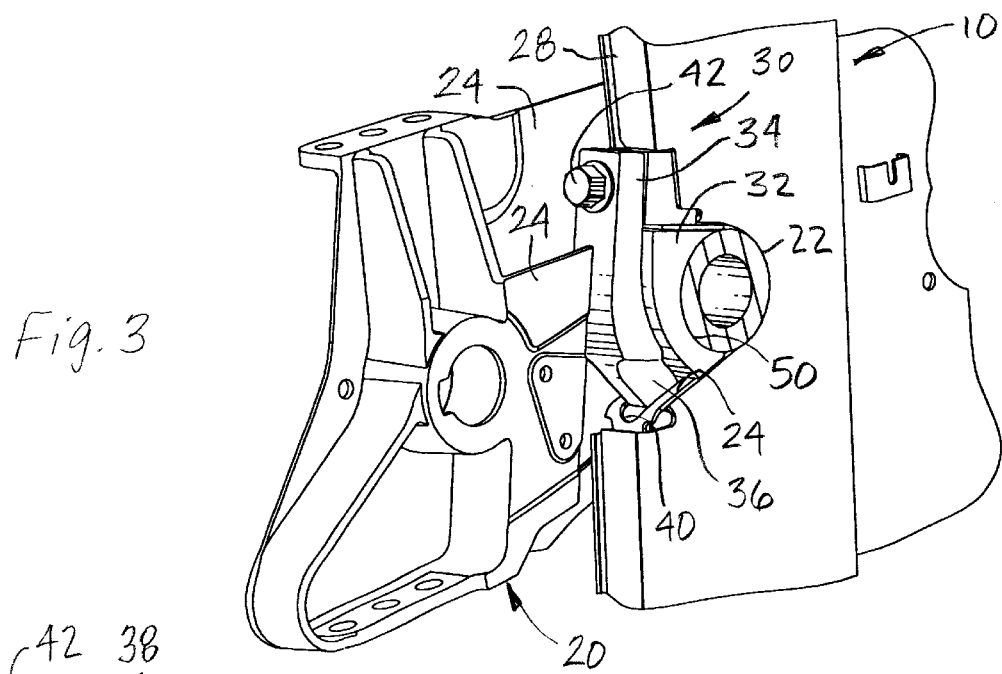
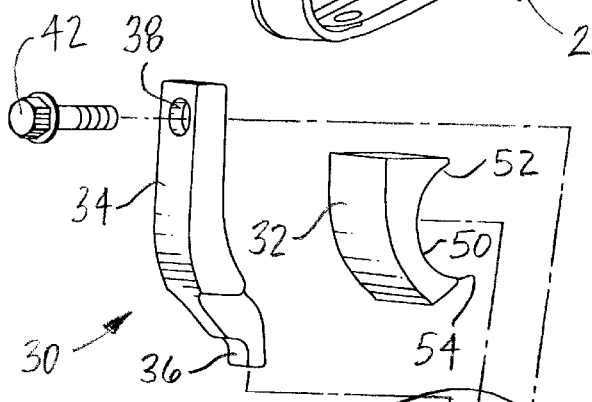
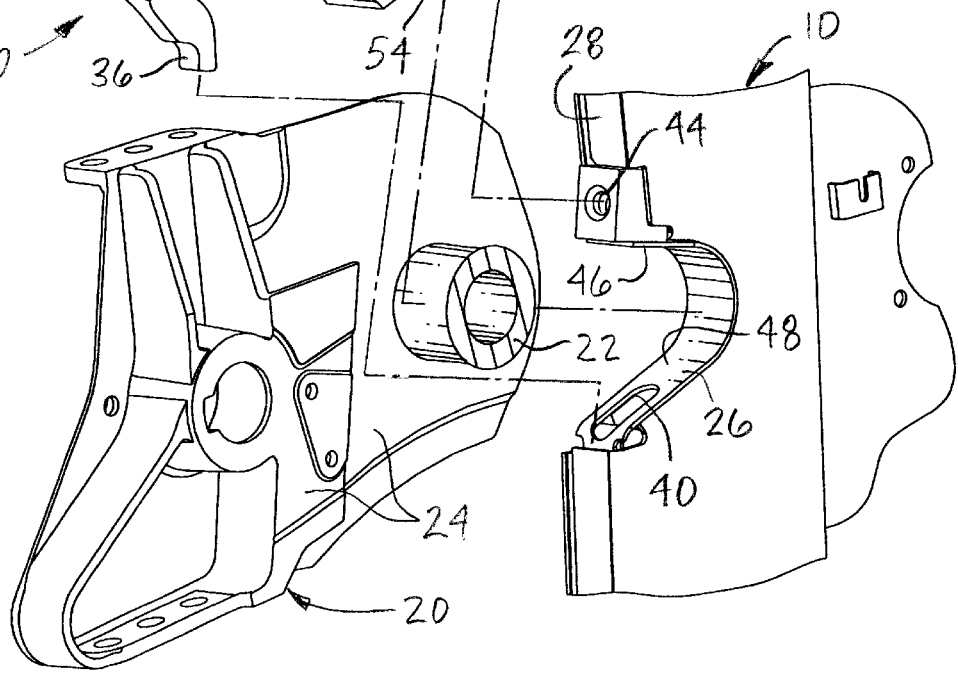
Fig. 3
Fig. 4

MULTI-PIECE FEEDERHOUSE BUSHING RETAINER

BACKGROUND OF THE INVENTION

Conventional combines include a header attached to the front of the combine vehicle. The header engages and cuts the crop as the combine vehicle travels through an agricultural field. The cut crop is then directed to the middle of the header where it is directed upwardly and rearwardly through a feederhouse. The feederhouse directs the cut crop rearwardly to the combine vehicle for further processing. The header and feederhouse are generally rigidly coupled together during operation. The feederhouse is coupled with the combine vehicle such that the feederhouse and header can pivot with respect to the combine vehicle.

Structure is provided for allowing the header and feederhouse to pivot with respect to the combine vehicle. Fixed to conventional feederhouses are a pair of laterally spaced pivot tubes. Structure at the front of the combine vehicle is provided for engaging these pivot tubes. The structure at the front of the combine vehicle serves to hold the pivot tubes while allowing the pivot tubes to pivot with respect to the combine vehicle. The feederhouse and header are thereby allowed to pivot with respect to the combine vehicle.

Some headers are automatically controlled by devices which pivot the header in response to undulations in ground contour. Headers provided with such control devices are typically pivoted relatively frequently during operation. Each time the header is pivoted with respect to the combine vehicle, the pivot tube pivots slightly within the structure that is holding it to the combine. The pivot tubes, as well as the structure at the front of the combine that holds the pivot tubes, rub against each other and tend to experience a large amount of wear due to the frequent pivoting of the header across undulating ground contours. The problem of wear is further exacerbated by the use of wider and wider headers. The wider headers weigh more than narrower headers, and therefore the greater weight of the wider headers causes even greater wear.

One type of pivot tube mechanism includes a casting having spaced apart side walls that support respective left and right ends of a pivot tube. To attach a header and feederhouse to a combine vehicle an operator drives the combine vehicle toward the feederhouse from behind until the pivot tubes are positioned within V-shaped notches formed in the front portion of the combine vehicle framework. The pivot tubes are then captured or confined in position within the notch by fixing a retainer in position across the opening of the notch. Conventional combines provide a retainer having a lower peg portion that is received within a mating opening in the lower portion of the notch. A bolt can then be tightened on the upper portion of the retainer and into a threaded opening at the top portion of the notch to thereby fix the retainer in position to effectively close the open portion of the V-shaped notch and confine the pivot tube in proper position within the V-shaped notch.

The width of the pivot tube and the spacing of the casting side walls is slightly greater than the thickness of the framework that forms the notch. This allows clearance for the framework to be inserted between the side walls of the casting and facilitates easy insertion of the pivot tube into the notch. Because the framework is narrower than the spacing of the casting side walls, the pivot tube and casting can shift laterally slightly during operation. The retainer has a width that is no greater than the width of the framework and thereby can be positioned in proper position in alignment with the peg opening and the threaded opening regardless of the lateral position of the pivot tube and casting.

It would therefore be desirable to provide a pivot tube and associated structure at the front of the combine for holding the pivot tube and that is well adapted for withstanding the frequent pivoting motion that results from use of controls that adjust the orientation of the header over undulating ground contours. It would also be desirable to provide such a mechanism that is well adapted for withstanding the increased loads associated with the increased weight of relatively wide headers. It would also be desirable to provide such a mechanism that is capable of being retrofitted to existing combines in a cost effective manner. It would be desirable for such a mechanism to be adapted for use with a casting having side walls spaced slightly wider than the thickness of the framework that forms the notch for receiving the pivot pin.

SUMMARY OF THE INVENTION

The present invention provides a two piece retainer structure for securely confining a feederhouse pivot tube within a V-shaped notch defined in a combine frame structure. A first retainer piece is made of a polymer material and includes a relatively large arced portion that abuts a large area of the pivot tube. The first retainer piece is generally as wide as the side walls of the casting that holds the pivot tube, and therefore the first retainer abuts the pivot tube across a relatively wide area. A second retainer piece abut the first retainer piece and is coupled to the combine vehicle frame by way of a peg member positioned within an opening in the frame and a bolt member that secures the top portion of the second retainer piece to the combine frame.

The two-piece design of the retainer mechanism according to the present invention allows different materials to be utilized to thereby enhance the wear characteristics and generally allow the mechanism to resist wear better. The two piece retainer according to the present invention operatively abuts the pivot tube across a relatively large surface area to better transmit forces and to better resist friction and wear. The two piece retainer is adapted to be retrofitted to existing combines already in use which include a similar type of casting, pivot tube, V-shaped notch and attaching geometry.

BRIEF DESCRIPTION OF THE DRAWINGS

FIG. 3 is a perspective view of the assembled pivotal connection of FIG. 2, with a portion of the casting removed to illustrate the pivot tube, first retainer piece, and second retainer piece and V-shaped notch according to the present invention.

FIG. 4 is an exploded view of the pivotal connection structure according to the present invention, with a portion of the casting removed to show the pivot tube.

DESCRIPTION OF THE PREFERRED EMBODIMENT

Figure 1:
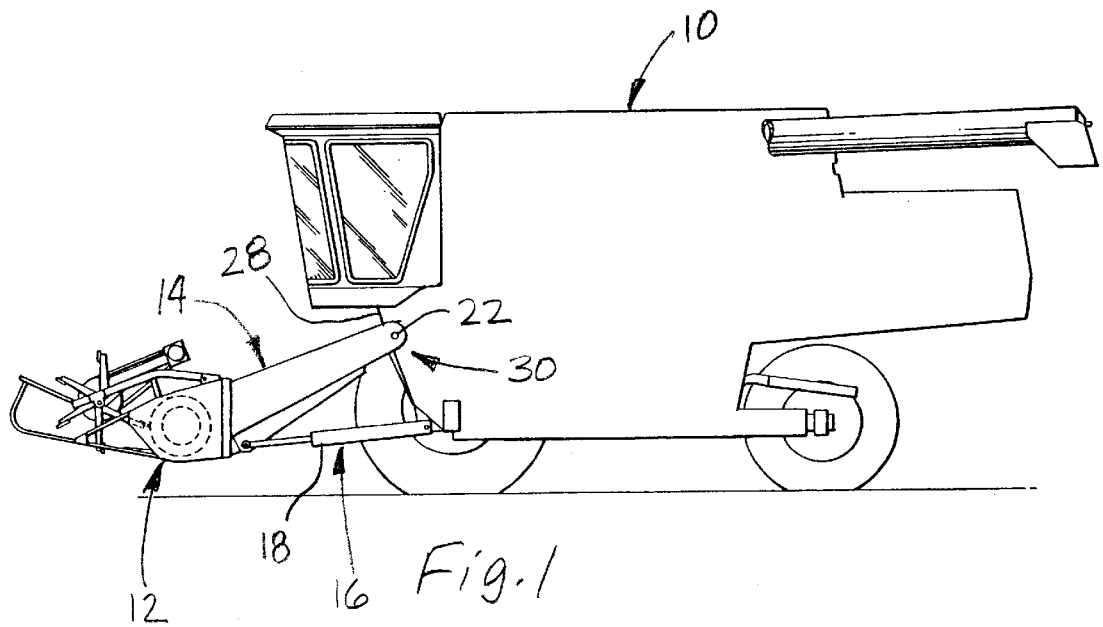
FIG. 1 is a schematic side view of a combine vehicle having a header and feederhouse and the pivotal connection mechanism according to the present invention.
Figure 2:
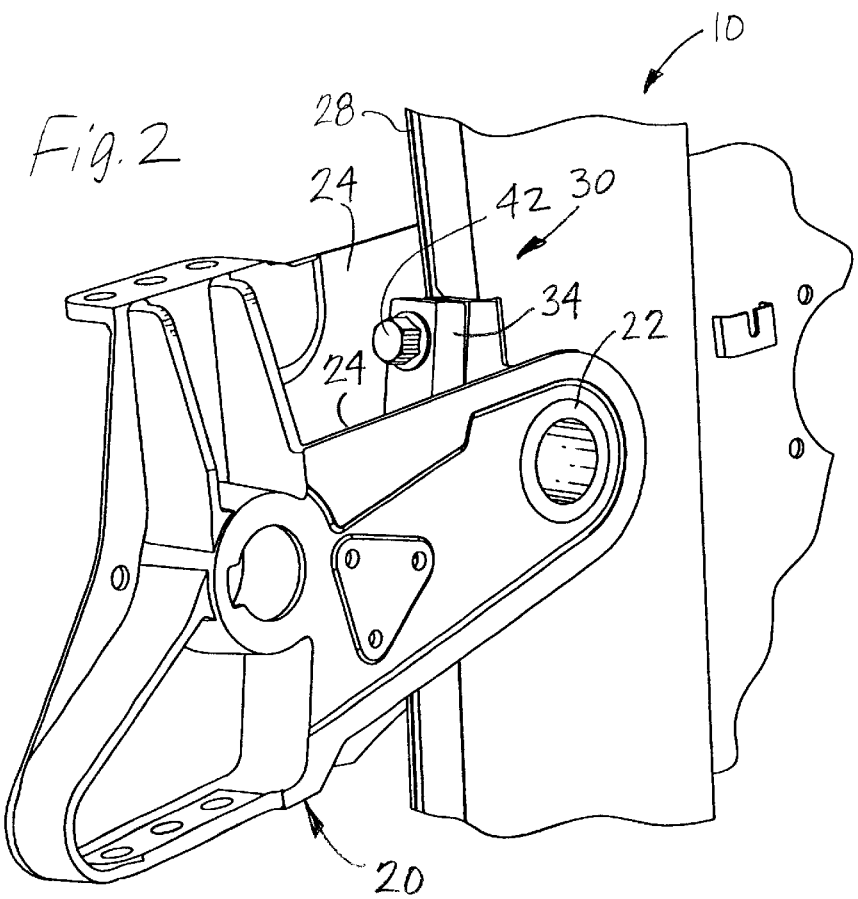
FIG. 2 is a perspective view of the assembled pivotal connection between the combine vehicle and the feederhouse.
Figure 5:
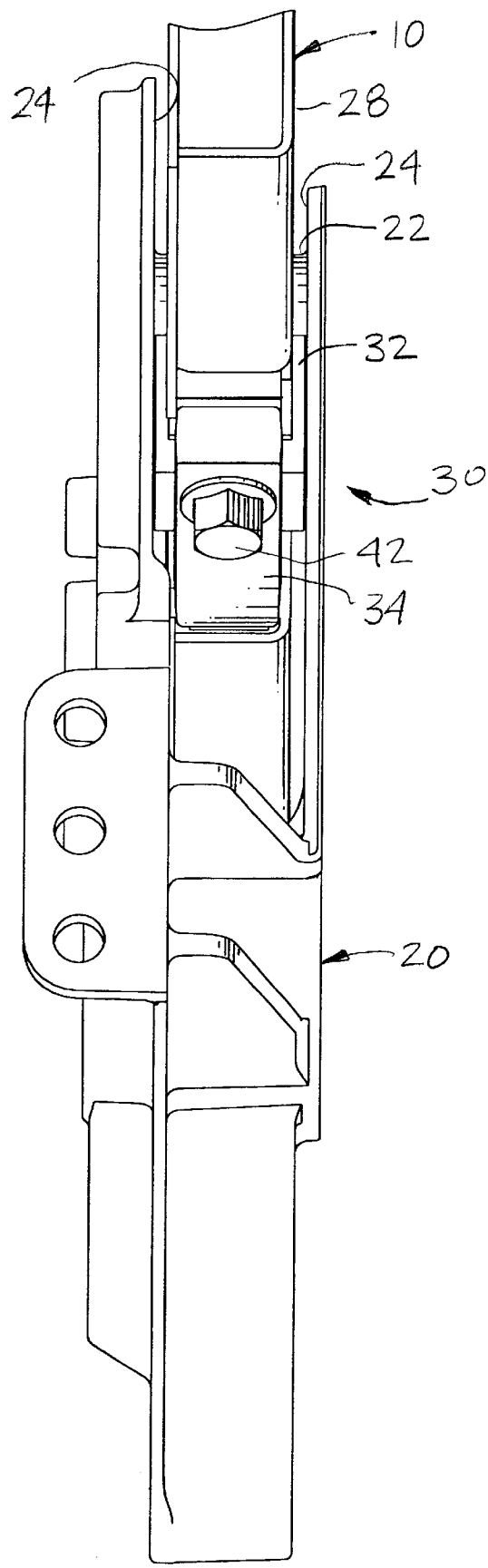
FIG. 5 is a top view of the assembled pivotal connection structure according to the present invention.

Referring now to FIG. 1, there is shown a combine vehicle 10 having a header 12 and feederhouse 14 mounted to the front of the combine vehicle 10. During operation the combine 10 travels forward in a field wherein a crop is to be harvested. The header 12 engages and cuts the crop, and directs the cut crop to the center of the header 12. Once in the central portion of the header 12 the harvested crop is directed upwardly and rearwardly through the feederhouse 14 for further processing within the combine vehicle 10.

The combine 10 may be provided with a control mechanism 16 that automatically controls the position of the header 12 and feederhouse 14 with respect to the combine vehicle 10. Hydraulic cylinders 18 may be provided which pivot the header 12 and feederhouse 14 with respect to the combine vehicle 10 to thereby automatically accommodate undulations in ground contour.

Rigidly fixed to respective sides of the feederhouse 14 are a pair of support structures or castings 20 which each include a cylindrical pivot member or tube 22 rigidly fixed therein. The casting 20 includes a pair of laterally spaced side walls 24 between which the pivot tube 22 extends. The pivot tubes 22, castings 20, feederhouse 14, and header 12 are rigidly fixed to each other and therefore pivot as a unit during operation. The pivot tube 22 is received within a V-shaped notch 26 formed in a frame portion 28 at the front of the combine vehicle 10. The pivot tube 22 is held in place and confined within the notch 26 by a two piece retainer mechanism 30 according to the present invention. A first retainer piece 32 is made of a polymer material is positioned directly against the pivot tube 22 within the V-shaped notch 26. A second retainer piece 34 is a cast metal part and includes a peg portion 36 at its lower end and an opening 38 in its upper portion. The peg portion 36 is received within an opening 40 proximate the lower portion of the V-shaped notch 26. A bolt 42 is positioned within the opening 38 at the top of the second retainer piece 34 and is received within a threaded opening 44 proximate the upper portion of V-shaped notch 26. When assembled the first and second retainer pieces 32, 34 confine the pivot tube 22 within the V-shaped notch 26 and allow the pivot tube 22 to pivot with respect to the frame 28 and combine vehicle 10 to thereby allow the header 12 and feederhouse 14 to be pivoted by the automatic controller 16.

The first retainer piece 32 is confined in its proper position by abutment against the pivot tube 22, the upper 46 and lower 48 surfaces of the V-shaped notch 26, the side walls 24 of the casting 20 and the second retainer piece 34. The back surface of the first retainer piece 32 and the front surface of the second retainer piece 34 have matching arced shapes to better transmit forces therebetween and reduce wear between those two parts.

To assemble the mechanism according to the present invention, the operator drives the combine vehicle 10 toward the feederhouse 14 so that the V-shaped notches 26 receive the pivot tubes 22. The first retainer member 32 is then placed in position against the pivot tube 22. While holding the first retainer piece 32 in place, the operator inserts the peg portion 36 of the second retainer 34 into the opening 40 proximate the lower end 48 of the V-shaped notch 26 and then pivots the second retainer 34 upwardly until the opening 38 at the top of the second retainer piece 34 is aligned with the threaded opening 44 proximate the upper end 46 of the V-shaped notch 26. The operator then inserts the bolt 42 into the opening 38 in the second retainer 34 and threads it into the threaded opening 44 in the frame structure 28. The pivot tube 22 is then securely confined in proper position, and the operator then repeats this procedure to secure the other pivot tube 22 within the other V-shaped notch 26.

The first retainer piece 32 has a width generally equal to the spacing between the side walls 24 of the casting 20. This allows the first retainer 32 to contact the pivot tube 22 across a relatively large area. The second retainer piece 34 is approximately as wide as the frame structure 28 that defines the V-shaped notch 26. This allows the second retainer piece 34 to be placed in proper position regardless of the lateral position of the casting 20 with respect to the frame structure 28 when the pivot tube 22 is positioned within the V-shaped notch 26.

The retainer mechanism 30 according to the present invention includes a plurality of pieces, and therefore the respective pieces can be made of different materials such as metal and polymer so as to enhance the wear characteristics of the retainer assembly 30. The retainer pieces can be manufactured of materials that effectively reduce the wear between the pivot tube 22, first retainer piece 32 and second retainer piece 34, and that also provide enough structural strength to withstand the loads imparted to the various parts during operation of the combine 10. The first retainer piece can be manufactured of a polymer material such as a Vervon branded material manufactured by a company known as L.N.P. The first retainer may also be manufactured of a powdered metal material.

The first retainer piece 32 has an arced portion 50 that engages the pivot tube 22 across a large portion of the radius of the pivot tube 22. Because the first retainer piece 32 can be linearly slid into position against the pivot tube 22, it can be designed with a longer arced portion 22. Conventional single piece retainer mechanisms had to be pivoted into position after the peg portion was positioned within an opening, and therefore the arced portion of conventional single piece retainers could not include an arced portion that extended very far because the outer edge of the arced portion would be blocked by the pivot tube as it is swung into position. Therefore, providing a first retainer piece 32 that is separate from the second retainer piece 34 in accordance with the present invention allows the use of an arced portion 50 that engages the pivot tube 22 across a relatively large portion of the pivot tube's radius. The larger arced portion 50 helps distribute the forces from the pivot tube 22 throughout the first retainer piece 32, and enhances the wear characteristics of the assembly. The upper and lower portions 52 and 54 of the arced portion 50 in particular are helpful for placing material where large forces are transmitted from the pivot tube 22 to the retainer 30 at those locations.

The two-piece retainer mechanism 30 according to the present invention is adapted to be retrofitted to existing combines having single piece retainer mechanisms. The two-piece retainer 30 according to the present invention includes a first retainer piece 32 that fits within the spacing of the side walls of existing castings. Furthermore, the second retainer piece 34 has a peg member 36 and opening 38 that are in the same location as conventional single piece retainers, and therefore the first and second pieces 32, 34 of the two-piece retainer 30 according to the present invention will fit on conventional combines having similar pivot tubes, castings and V-shaped notches.

What is claimed is:

1. A mechanism for pivotally attaching a feederhouse to a frame of a combine vehicle, comprising:

a pivot member coupled with the feederhouse, and a retainer mechanism that retains the pivot member with the frame of the combine vehicle, said retainer mechanism comprises a first piece that abuts the pivot member, and a second piece that operatively retains the first piece against the pivot member, said second piece being fixable to the frame of the combine vehicle wherein the first piece is a polymer material and the second piece is a metal material.

2. The mechanism according to claim 1, and further comprising a notch formed in the frame of the combine for receiving the pivot member.

3. The mechanism according to claim 2, wherein the second piece is positioned across an opening in the notch, and the first and second pieces confine the pivot member within the notch.

4. The mechanism according to claim 1, wherein the pivot member is generally cylindrical, and the first piece includes an arced portion which abuts the pivot member.

5. The mechanism according to claim 4, wherein the second retainer piece includes a peg member received within an opening defined in the frame of the combine, and the second retainer is pivoted into position against the first piece after the peg member is positioned within said opening.

6. The mechanism according to claim 5, and further comprising a bolt member which secures the second piece to the frame of the combine after the peg member has been positioned in said opening.

7. The mechanism according to claim 1, and further comprising a support structure extending between the pivot member and the feederhouse, the support structure having spaced side walls between which the pivot member is fixed, the spacing of the side walls being larger than a width of a portion of the frame of the combine to which the pivot member is operatively attached, and the first piece is generally as wide as the spacing of the side walls.

8. The mechanism according to claim 7, wherein the first piece is positioned between the side walls.

9. The mechanism according to claim 7, wherein the second piece is narrower than the spacing between the side walls.

10. The mechanism according to claim 9, wherein the second piece is positioned between the side walls.

11. The mechanism according to claim 9, wherein the first and second pieces are positioned between the side walls.

12. A mechanism for pivotally attaching a feederhouse to a frame of a combine vehicle, comprising:

a generally cylindrical pivot member coupled with the feederhouse, a notch formed in the frame of the combine for receiving the pivot member, a support structure extending between the pivot member and the feederhouse, the support structure having spaced side walls between which the pivot member is fixed, the spacing of the side walls being larger than a width of a portion of the frame of the combine to which the pivot member is operatively attached, and a retainer mechanism that retains the pivot member with the frame of the combine vehicle, said retainer mechanism comprises a first piece that includes an arced portion which abuts the pivot member, and a second piece fixable to the frame of the combine vehicle, the first piece extends across an opening of the notch and operatively retains the first piece against the pivot member, said first and second pieces being positioned between the side walls of the support structure and confine the pivot member within the notch, said second piece being fixable to the frame of the combine vehicle, the first piece is substantially as wide as the spacing of the side walls and the second piece is substantially narrower than the spacing between the side walls.

13. The mechanism according to claim 12, wherein the first piece is a polymer material.

14. The mechanism according to claim 13, wherein the second piece is a metal material.

15. The mechanism according to claim 12, wherein the second retainer piece includes a peg member received within an opening defined in the frame of the combine, and the second piece is pivoted into position against the first piece after the peg member is positioned within said opening.

16. The mechanism according to claim 15, and further comprising a bolt member which secures the second piece to the frame of the combine after the peg member has been positioned in said opening.

17. A mechanism for pivotally attaching a feederhouse to a frame of a combine vehicle, comprising:

a generally cylindrical pivot member coupled with the feederhouse, a notch formed in the frame of the combine for receiving the pivot member, a support structure extending between the pivot member and the feederhouse, the support structure having spaced side walls between which the pivot member is fixed, the spacing of the side walls being larger than a width of a portion of the frame of the combine to which the pivot member is operatively attached, a retainer mechanism that retains the pivot member with the frame of the combine vehicle, said retainer mechanism comprises a first piece of a polymer material having an arced portion which abuts the pivot member, and a second piece of a metal material fixable to the frame of the combine vehicle, the first piece extends across an opening of the notch and operatively retains the first piece against the pivot member, said first and second pieces being positioned between the side walls of the support structure and confine the pivot member within the notch, said second piece being fixable to the frame of the combine vehicle, the first piece is substantially as wide as the spacing of the side walls and the second piece is substantially narrower than the spacing between the side walls, the second piece includes a peg member received within an opening defined in the frame of the combine, the second piece being pivoted into position against the first piece after the peg member is positioned within said opening, and a bolt member which secures the second piece to the frame of the combine after the peg member has been positioned in said opening.

* * * * *